March 7, 1967 C. A. COOK 3,307,528
COMBUSTION ENGINE HEATED STOVE
Filed April 16, 1965 2 Sheets-Sheet 1

INVENTOR
CHARLES A. COOK
BY *Beale and Jones*
ATTORNEYS

March 7, 1967  C. A. COOK  3,307,528
COMBUSTION ENGINE HEATED STOVE
Filed April 16, 1965  2 Sheets-Sheet 2

INVENTOR
CHARLES A. COOK
BY Beale and Jones
ATTORNEYS

United States Patent Office 3,307,528
Patented Mar. 7, 1967

3,307,528
COMBUSTION ENGINE HEATED STOVE
Charles A. Cook, 923 Main St., Little Rock, Ark. 72202
Filed Apr. 16, 1965, Ser. No. 448,626
7 Claims. (Cl. 126—19.5)

This invention relates to a stove which is particularly adapted to receive its heat from the exhaust gases of an internal combustion engine.

The convenience of using engine exhaust gases for heating has long been recognized. The elimination of needs for fuel, means for pressurizing the fuel, and complicated atomizer and burner structures makes this type of device especially useful to those who eat out-of-doors such as campers, construction workers and military personnel in the field. Quite often, persons in these groups have a motor vehicle available, and its exhaust gases may be used to heat the present stove.

Insofar as is known, this type of stove has never attained an appreciable degree of commercial acceptance. One reason for this lack of success is that the temperature of the cooking surface cannot be regulated as it can in other types of stoves. Any temperature regulation by stopping and starting the engine in generally undesirable due both to its inconvenience and the inability of the stove to retain its heat after the engine is shut off. The wide variations in temperature produced in this manner deters the orderly and satisfactory preparation of foods.

Accordingly, it is a principal object of this invention to provide a cooking stove which has means for regulating and stabilizing its temperature, independently of the operation of the engine. This is accomplished by the provision of liquid-receiving pockets in the cooking surface, which depend into the chamber through which the exhaust gases pass.

Another object is to provide such a stove with means for retaining heat so that food may be cooked even after the engine is turned off. This, too, is accomplished by the liquid-receiving pockets which serve as heat sinks.

A further object is to provide an effective baffle means for causing the exhaust gases to follow a circuitous route through the stove, and to effectively transfer the heat from these baffles to the stove's cooking surface.

These and other objects are realized by the present invention which calls for a stove having walls of heat resistant material defining an exhaust-receiving chamber, with an uppermost of these walls having a generally horizontal flat cooking surface provided with pockets which project into the chamber. These pockets are capable of holding a liquid for stabilizing the heat of the stove. An inlet conduit has means on one end for engaging an exhaust outlet of an internal combustion engine, and its opposite end communicates with the stove chamber at a given point. The chamber has an outlet opening spaced from this given point. Within the chamber, there may be a series of planar baffles which lie transversely to a line between the given point and the outlet opening. These baffles have openings which are misaligned with the openings in the adjacent baffles. The upper edges of the baffles contact the cooking surface in heat-transferring relatioinship to carry the heat of the exhaust gases up to the cooking surface.

The invention may be more clearly understood by a study of the following specification and the drawings, which describe one possible embodiment. In the drawings.

Figure 1:
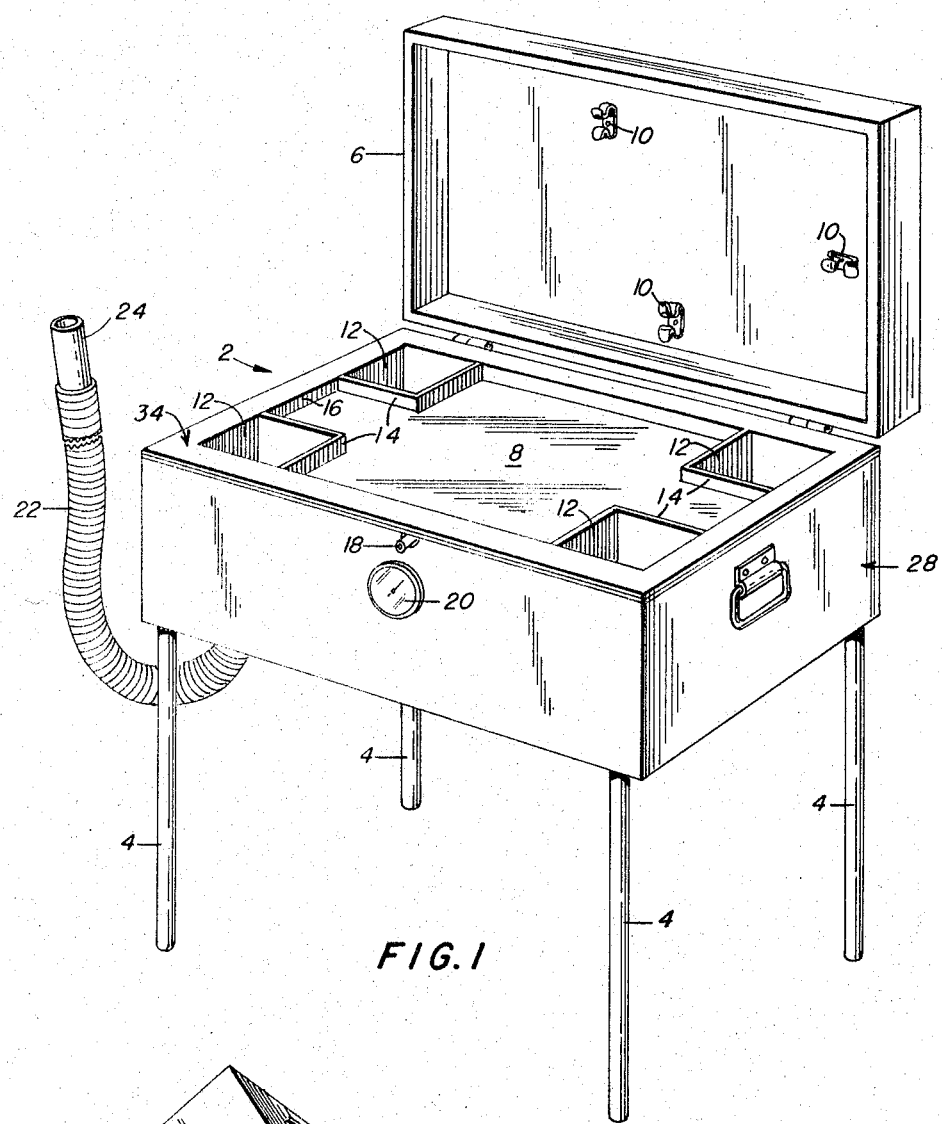
FIG. 1 is a perspective view of a stove utilizing the principle of this invention, assembled and ready for connection to an internal combustion engine.

In FIG. 1, it will be seen that the stove of this invention includes a main body 2, supported on four legs 4. These legs are held in sockets 5, shown in FIG. 2. A hinged cover 6 is used to cover the cooking surface 8 when the stove is stored. One occasions this cover is useful when cooking; for example, when steaming foods. Also, it is useful when warming the stove up to cooking temperature, when it prevents excessive loss of heat from the cooking surface. Inside the top of cover 6 are a series of clips 10 for holding the legs and the flexible conduit 22 when the stove is dismantled.

A series of four pockets 12 is in an depending beneath the cooking surface 8. As shown, they are located at the four corners of the cooking surface. To prevent grease from entering these pockets, small upstanding walls 14 surround them. These walls continue, as at 16, to surround the cooking surface. A tubular grease drain outlet 18 may project through this wall.

The pockets 12 serve two functions. They may be used for heating cans of food, soups or other liquids. More significantly, they constitute a means for regulating and stabilizing the heat of the stove. Adding a cool liquid to these will reduce the temperature of the stove, and removal of all liquid will enable the stove to attain its maximum temperature. If a substantial volume of heated liquid is held in the pockets 12, the engine supplying the heat may be stopped, and the temperature of the stove will be maintained for a considerably longer period than if there were no liquid. This, of course, is due to the ability of the liquids to retain a greater amount of heat than can the thin metallic shell of the stove.

The combined volumetric capacity of the four pockets must be at least 1.5 gallons in order to obtain a satisfactory degree of temperature regulation and heat stabilization. An experimental model having a 3 gallon total liquid capacity has proven to be most satisfactory.

To assist users in maintaining proper cooking conditions, the stove may have a thermometer 20 which senses and indicates the temperature in the enclosed chamber beneath the cooking surface.

Figure 2:
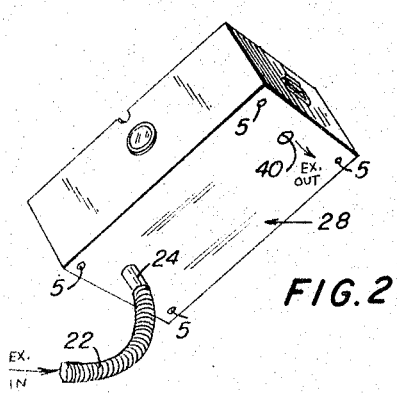
FIG. 2 is a perspective view of the underside of the stove, showing the exhaust inlets and outlets, and the sockets for the supporting legs.

Heat for cooking is transmitted to the stove by means of a flexible heat-resistant conduit 22. One end of the conduit is provided with a rigid sleeve 24 which telescopically fits onto the exhaust conduit of an internal combustion engine. The opposite end of conduit 22 is adapted to fit into the lower wall of the stove and to communicate with the chamber beneath the cooking surface as shown in FIG. 2.

All of the exhaust gases circulate through the enclosed chamber beneath the cooking surface 8. In this chamber, the heat from the gases is transmitted to the fluids in pockets 12 and to the cooking surface 8.

Figure 3:
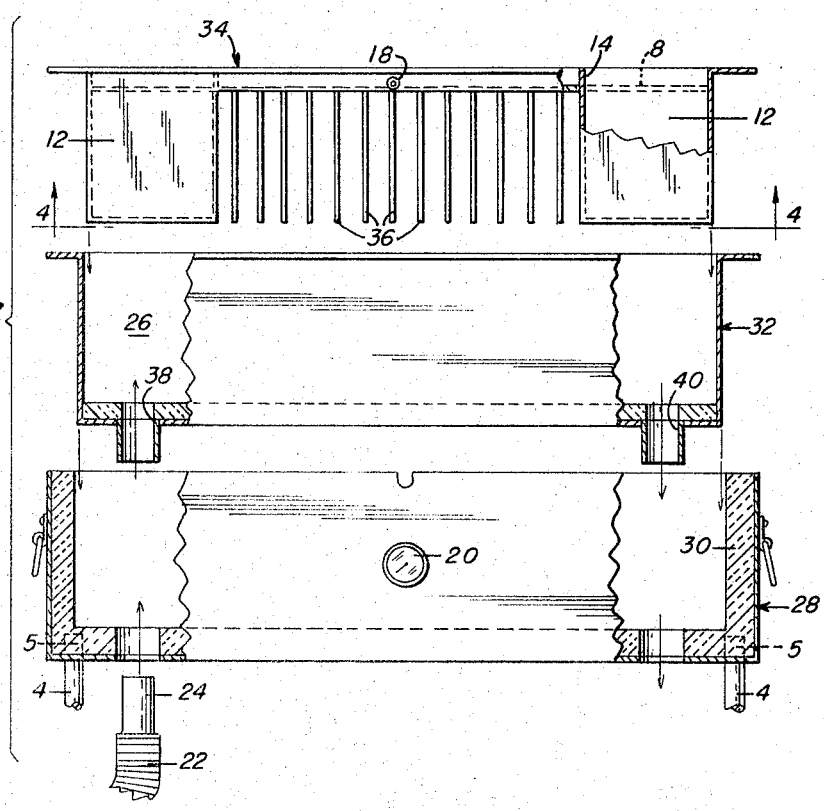
FIG. 3 is an exploded front elevation of the stove, partially in section.

The stove body is essentially formed of three interfitting assemblies, shown in FIG. 3. The lowermost assembly is an outer casing 28 which, due to its layers of insulating material 30, provides a relatively cool outer surface on the stove to reduce the danger of burns.

The enclosed exhaust gas chamber 26 has its four walls and bottom defined by the intermediate section 32. This section is fabricated of a heat-resistant material such as metal to enable it to withstand the temperatures necessary for cooking.

Figure 4:
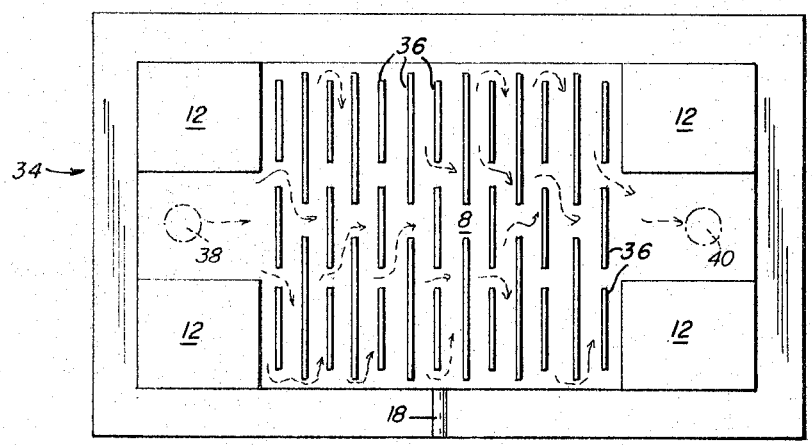
FIG. 4 is a view of the underside of the cooking surface, showing the baffles and the liquid-receiving pockets.

Telescopically fitting into section 32 is the upper section 34. This includes the generally horizontal cooking surface 8, the depending pockets 12 and a plurality of planar baffles 36. The pockets 12 extend a major distance into the cooking chamber and, as shown in FIG. 4, two of them are oriented on opposite sides and closely adjacent to the exhaust gas inlet 38. This permits the incoming exhaust gases to immediately impinge on the walls of the pockets, thus enabling the fluids in the pockets more readily to receive and store heat from the exhaust gases.

The path of the gases in the chamber 26 is from the inlet point 38 to the outlet opening 40 spaced therefrom. Intermediate the inlet and outlet are the baffles 36 which are attached to the underside of the cooking surface 8. The baffles serve the dual function of slowing the gas flow to permit greater heat transfer, and to transmit heat by conduction to the cooking surface 8. In FIG. 4 it will be seen that the baffles 36 lie transversely to a line between the gas inlet and outlet. Each is provided with at least one opening which is misaligned with openings in the baffles immediately adjacent thereto. The circuitous course which gases follow through the chamber 26 around the baffles permits the gases to deliver most of their useful heat before they leave the stove.

Preparatory to operation of the stove, the legs 4 are inserted in their sockets 5, shown in FIG. 2. The flexible conduit 22 has its ends attached to the engine exhaust and the stove inlet. The engine is started and its exhaust gases proceed through conduit 22 against and between the pockets 12, through the chamber 26 with the baffles 36, and out through the outlet opening 40. If it is desired to heat edible liquids in the pockets 12, they may be filled before the engine is started. If the pockets 12 are used only for temperature control, they may be filled after the stove is brought up to the desired temperature. After an operator has gained experience in the use of this stove, he may develop other modes of using the pockets 12 for temperature control or heat stabilization.

From the foregoing, it will be appreciated that a new and useful engine exhaust stove capable of having its temperature regulated has been developed. The invention may assume many modified forms in addition to the sole embodiment disclosed herein. The scope of protection afforded hereby is not restricted to the single form shown, but is delineated in the claims which follow.

I claim:

1. A cooking stove heated by the exhaust of an internal combustion engine, comprising: walls of heat resistant material defining an enclosed chamber, an uppermost one of said walls having a flat generally horizontal cooking surface, a depending pocket in said cooking surface projecting a major distance into said chamber, said pocket being capable of holding a liquid for stabilizing the heat of said stove, an inlet conduit having means at one end for engaging an exhaust outlet of an internal combustion engine and having its opposite end communicating with a given point in said chamber, said pocket being located adjacent said inlet conduit at said given point to receive and store heat from incoming exhaust gases, said chamber having an outlet opening spaced from said given point.

2. A cooking stove heated by the exhaust of an internal combustion engine, comprising: walls of heat resistant material defining an enclosed chamber, an uppermost one of said walls having a flat generally horizontal cooking surface, a depending pocket in said cooking surface projecting a major distance into said chamber, said pocket being capable of holding a liquid for stabilizing the heat of said stove, an inlet conduit having means at one end for engaging an exhaust outlet of an internal combustion engine and having its opposite end communicating with a given point in said chamber adjacent to said pocket, said chamber having an outlet opening in said chamber spaced from said given point.

3. A cooking stove heated by the exhaust of an internal combustion engine, comprising: walls of heat resistant material defining an enclosed chamber, an uppermost one of said walls having a flat generally horizontal cooking surface, a depending pocket in said cooking surface projecting a major distance into said chamber, said pocket being capable of holding a liquid for stabilizing the heat of said stove, an inlet conduit having means at one end for engaging an exhaust outlet of an internal combustion engine and having its oposite end communicating with a given point in said chamber, said pocket being located adjacent said inlet conduit at said given point to receive and store heat from incoming exhaust gases, said chamber having an outlet opening spaced from said given point, a series of planar baffles in said chamber lying transversely to a line between said given point and said outlet opening, each of said baffles having openings misaligned with openings in adjacent baffles, said baffles having their upper edges contacting and in heat-transferring relationship with said uppermost wall.

4. A cooking stove according to claim 3 in which said pocket has a capacity of at least 1.5 gallons.

5. A cooking stove heated by the exhaust of an internal combustion engine, comprising: walls of heat resistant material defining an enclosed chamber, an uppermost one of said walls having a flat generally horizontal cooking surface, a depending pocket in said cooking surface projecting a major distance into said chamber, said pocket being capable of holding a liquid for stabilizing the heat of said stove, an upstanding wall on said cooking surface surrounding said pockets and said cooking surface, an inlet conduit having means at one end for engaging an exhaust outlet of an internal combustion engine and having its opposite end communicating with a given point in said chamber adjacent to said pocket, said chamber having an outlet opening spaced from said given point, a series of planar baffles in said chamber lying transversely to a line between said given point and said outlet opening, each of said baffles having openings misaligned with openings in adjacent baffles, said baffles having their upper edges contacting and in heat-transferring relationship with said uppermost wall.

6. A cooking stove heated by the exhaust of an internal combustion engine, comprising: walls of heat resistant material defining an enclosed chamber, an uppermost one of said walls having a flat generally horizontal cooking surface, a series of spaced-apart depending pockets in said cooking surface projecting a major distance into said chamber, said pockets being capable of holding a liquid for stabilizing the heat of said stove, an upstanding wall on said cooking surface surrounding said pockets and said cooking surface, said upstanding wall having a grease drain outlet therein, an inlet conduit having means at one end for engaging an exhaust outlet of an internal combustion engine and having its opposite end communicating with a given point in said chamber, said chamber having an outlet opening in said chamber spaced from said given point, a series of planar baffles in said chamber lying transversely to a line between said given point and said outlet opening, each of said baffles having openings misaligned with openings in adjacent baffles, said baffles having their upper edges contacting and in heat transferring relationship with said uppermost wall, thermometer means indicating the temperature in said chamber, downwardly open sockets in a bottom wall of said chamber, and legs removably received in said sockets.

7. A cooking stove according to claim 6 in which said pockets have a total capacity of at least 1.5 gallons.

References Cited by the Examiner

UNITED STATES PATENTS

| | | | |
|---|---|---|---|
| 1,532,945 | 4/1925 | Quigle | 126—19.5 |
| 1,559,909 | 11/1925 | Paul | 126—19.5 |
| 1,584,514 | 5/1926 | Deeter | 126—19.5 |
| 1,636,393 | 7/1927 | Theophiledes | 126—33 |

FREDERICK L. MATTESON, Jr., *Primary Examiner.*

E. G. FAVORS, *Assistant Examiner.*